July 16, 1963  B. L. STEVENS  3,098,209
PRESSURE TRANSDUCER
Filed Feb. 10, 1960
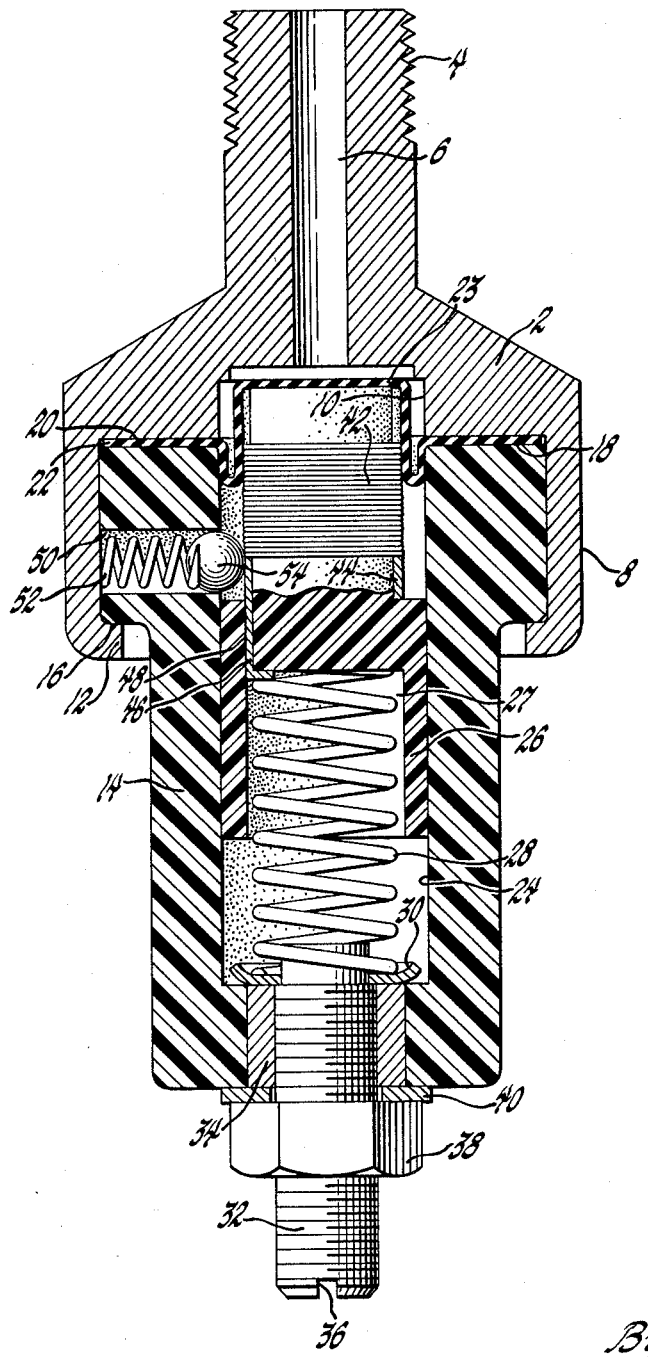
INVENTOR.
*Bryce L. Stevens*
BY
*Robert E. Fowler*
ATTORNEY ём
United States Patent Office 3,098,209
Patented July 16, 1963

3,098,209
PRESSURE TRANSDUCER
Bryce L. Stevens, Davison, Mich., assignor to General Motors Corporation, Detroit, Mich., a corporation of Delaware
Filed Feb. 10, 1960, Ser. No. 7,873
3 Claims. (Cl. 338—39)

This invention relates broadly to transducer means and more specifically to means for converting changes in fluid pressure into changes in electrical resistance for a large variety of purposes including the study of various machine operations.

There are many instances in which engineers find it necessary to obtain an accurate graph or record of changes in fluid pressure within an enclosure during a predetermined time interval and one of the easiest means of accomplishing such a record is to convert the pressure change into electrical voltage or current changes in an electrical circuit where these latter factors can be quickly and easily applied to known indicating apparatus.

It is the main purpose of my invention to provide a simple, rugged easily applied device for converting fluid pressure changes into resistance changes which are adapted to be incorporated in indicating circuits.

With these and other objects in view which will become apparent as the specification proceeds, my invention will be best understood by reference to the following specification and claims and the illustrations in the accompanying drawing, in which:

The FIGURE is a sectional view taken through a transducer device embodying my invention.

Referring now more particularly to the drawing, there is shown therein a device adapted to be connected in an electrical indicating circuit and also easily applicable to an enclosure within which fluid pressure changes occur which it is desired to measure. The transducer consists in the main of two parts, first a section 2 having a smaller threaded end 4 with a central bore or aperture 6 through which fluid may flow to the central enclosure of the transducer. Integral with the threaded end 4, which is adapted to be screwed into any available aperture in the housing wherein pressure changes occur, is a larger section and the member 2 becomes larger to form a cylindrical section 8 having a large central opening 10 which connects with the smaller bore 6. The member 2 may be of metal and its rim is adapted to be flanged over as at 12 to crimp around the end of the other half of the casing which consists of a tubular member 14 which may be of Bakelite or some other similar electrical insulating material. The tubular member 14 has an enlarged inner end 16 which fits within the clamped over section 12 to form a tight fit.

Clamped between the inner face 18 of the tubular insulating member 14 and the face 20 of the casing 2 is a flexible diaphragm 22 which extends across the whole section but is much larger in area than the cross-sectional area of the housing 2 and can be actuated axially of the opening in the chamber and act as a pump diaphragm. The central section 23 of the diaphragm is folded back from the main body. Mounted in a central opening 24 in the tubular member 14 is a reciprocating piston 26 formed of electrical insulating material and spring biased toward the upper end of the casing 2 by a compressed spring 28 which fits within a depression 27 in one end of the piston 26 and seats on a washer 30 around the end of a threaded stub shaft 32 which is provided to adjust the spring tension. The threaded shaft 32 threadedly engages a fixed sleeve 34 mounted in the tubular member 14 and as it is threaded into the sleeve forces the washer inward to compress the spring 28 and thus bring more or less bias to bear on the piston 26. This stub shaft may be adjusted by the insertion of a screw driver in a slot 36 in the outer end of the shaft and then locked in place by a lock nut 38 bearing against a lock washer 40 on the outer surface.

The upper end of the piston 26 is of smaller diameter than the lower end and there is helically wound around the upper end a resistance wire 42, the lower end of which is staked into a brass sleeve 44, a projection 46 of which extends axially through an opening 48 in the piston 26 to the chamber 27 and then is bent over to engage the end of the compression spring 28. The diaphragm 22 is flexed up over the end of the piston in the configuration shown and it is to be noted that the space between the outer surface of the wound wire and the inner surface of the tubular member 14 is sufficient to allow the diaphragm to buckle on itself to give adequate travel of the piston.

In one side wall of the tubular member 14 within the housing 2 there is provided a radial opening 50 which extends from the inner surface of the member 8 through the tubular member 14. Within this opening 50 there is located a compression spring 52 and a small ball bearing 54 which is adapted to ride on the surface of the brass sleeve 44 or on the surface of the resistance wire which is bared to provide good electrical contact. This provides a good electrical path from the surface of the resistance wire to ground through the casing 2.

The electrical connections from indicating apparatus are thus made from ground or through the casing 2 and under the lock nut 38 and the electrical path through the transducer would be from the stud 32 through the spring 28, the brass sleeve extension 46, brass sleeve 44, resistance wire 42 to ball 54, spring 52 to the casing 2 to ground. However, if the pressure in the housing into which this device is threaded changes, pressure in the channel 6 will force the diaphragm 22 and thus the piston down and the ball 54 will roll over the surface of the resistance wires 42 inserting more resistance into the circuit as the piston moves inwardly. When the pressure in the bore 6 equals the pressure of the biasing spring 28, a balance will be obtained and no further movement will result and at that time a certain amount of resistance will be introduced into the electrical circuit just traced depending upon how far the ball 54 has rolled along the surface of the resistance wires 42.

It will be seen that with this device application to a pressure chamber is simple, merely by screwing the device into a threaded opening and that attachment of only one wire is necessary under the lock nut 38 since the other terminal will be ground and yet a very accurate and rapid determination of pressure changes can be obtained.

What is claimed is:

1. In transducer means, a hollow casing formed in part of electrically conductive material and in part of electrically non-conductive material and having an entrance duct through which pressure to be measured can be applied, a piston formed of electrically insulating material fitting snugly within the hollow casing and mounted for axial movement therein, biasing means directly engaging one end surface of the piston and the inside surface of one end wall of the electrically non-conductive part of the hollow casing for biasing said piston toward one end of its travel, an electrical contact mounted through said wall and engaging the biasing means to form an electrically conductive circuit therewith, a flexible diaphragm mounted across the opposite end of the piston inside the casing and pressing against the same, a resistance wire helically wound on a reduced section of said piston and electrically connected to the opposite end of the biasing means, and a spring biased contact mounted in and electrically connected to the electrically conductive portion of said case engaging and sliding over said resistance wire to connect a predetermined amount of wire in circuit dependent upon the axial position of the piston for measuring purposes.

2. In transducer means, a hollow casing formed in part of electrically conductive material and part electrically non-conductive material, said casing having a central cylindrical cavity and an aperture in one side through which fluid pressure to be measured may be applied, a cylindrical piston mounted snugly within said central cylindrical cavity in the hollow casing for axial movement and formed of electrically insulating material said piston engaging the cylindrical cavity over a substantial portion of the axial length of the piston, a helical winding of resistance wire on a reduced section of the peripheral surface of the piston extending over an appreciable axial distance, spring biasing means bearing against the non-conductive portion of the casing and one end of the piston and urging it in one direction, flexible diaphragm means stretched across said casing adjacent the other end of the piston and subject to the pressure in the aperture in one side of the casing and tending to force the piston against the spring bias means when pressure in said aperture changes and a biased contact mounted in that portion of the casing that is formed of electrically conductive material and bearing against the surface of the helically wound resistance wire to engage a different portion depending upon the position of the piston as determined by the pressure applied to the transducer.

3. In transducer means, a hollow casing formed in part of electrically conductive material and part electrically non-conductive material, said casing having a central cylindrical cavity and an aperture in one side through which fluid pressure to be measured may be applied, a cylindrical piston mounted snugly within said central cylindrical cavity in the hollow casing for axial movement and formed of electrically insulating material said piston engaging the cylindrical cavity over a substantial portion of the axial length of the piston, a helical winding of resistance wire on a reduced section of the peripheral surface of the piston extending over an appreciable axial distance, spring biasing means mounted in the casing and bearing against the non-conducting portion of the casing and one end of the piston and urging it in one direction, flexible diaphragm means stretched across said casing adjacent the other end of the piston one surface of which faces said aperture and tending to force the piston against the spring bias means when pressure in said aperture changes, a biased contact mounted in that portion of the casing that is formed of electrically conductive material bearing against the surface of the helically wound resistance wire to engage a different portion depending upon the position of the piston as determined by the pressure applied to the transducer, an electrically conductive adjustable contact mounted in that portion of the casing which is formed of electrically insulating material and which bears against the spring biasing means to change the bias on the cylindrical piston, and electrically conductive means mounted on the cylindrical piston between the spring biasing means and the end of the helical winding of resistance wire to complete a circuit therethrough for measuring purposes.

References Cited in the file of this patent

UNITED STATES PATENTS

| | | |
|---|---|---|
| 2,248,047 | Addy et al. | July 8, 1941 |
| 2,270,148 | Stowe | Jan. 13, 1942 |
| 2,373,292 | Clason | Apr. 10, 1945 |
| 2,441,894 | Mennecier | May 18, 1948 |
| 2,911,606 | Hoffman | Nov. 3, 1959 |